United States Patent Office 3,520,909
Patented July 21, 1970

3,520,909
NITRO-ESTRATRIENES AND PROCESS FOR PREPARING THEM
Alberto Consonni, Bianca Patelli, and Roberto Sciaky, Milan, Italy, assignors to Societa Farmacetici Italia, Milan, Italy, a corporation of Italy
No Drawing. Continuation-in-part of application Ser. No. 683,163, Nov. 15, 1967. This application Feb. 28, 1969, Ser. No. 803,415
Claims priority, application Italy, Nov. 15, 1967, 30,077/66
Int. Cl. C07c 169/20, 169/22
U.S. Cl. 260—397.45
20 Claims

ABSTRACT OF THE DISCLOSURE

Described is a new class of 9α-hydroxy-11β-nitro-1,3,5(10)-estratrienes of the formula:

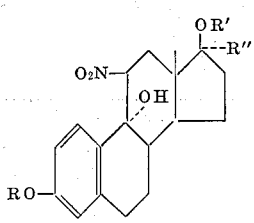

wherein R is selected from hydrogen, alkyl containing from 1 to 6 carbon atoms, ω-haloalkyl containing from 1 to 2 carbon atoms, cycloaliphatic radical containing from 5 to 6 carbon atoms, aliphatic acyl containing from 1 to 10 carbon atoms, cycloaliphatic acyl containing from 5 to 8 carbon atoms; R' is selected from hydrogen, monocarboxylic aliphatic acyl containing from 1 to 10 carbon atoms, di-carboxylic aliphatic acyl containing up to 6 carbon atoms and cycloaliphatic acyl containing from 5 to 8 carbon atoms; R" is selected from hydrogen, ethynyl and butinyl; OR' and R" may together be O. Also described is the process for the preparation thereof.

---

This is a continuation-in-part of application Ser. No. 683,163 filed Nov. 15, 1967 now abandoned and related to a new class of 9α-hydroxy-11β-nitro-1,3,5(10)-estratrienes of the formula:

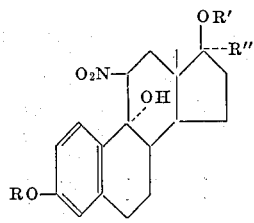

wherein R is a hydrogen atom, an optionally substituted alkyl radical containing from 1 to 6 carbon atoms, a cycloalkyl radical containing from 5 to 6 carbon atoms, an aliphatic or cycloaliphatic acyl radical containing from 1 to 10 carbon atoms, R' is a hydrogen atom, a mono or dicarboxylic or cycloaliphatic acyl radical containing from 1 to 10 carbon atoms. R" is a hydrogen atom or an alkyl radical containing from 1 to 4 carbon atoms. OR' and R" may together be =O, and the process for the preparation thereof.

The present invention relates to new nitroestratrienes and to the process for preparing them. More particularly, our invention is to the class of 9α-hydroxy-11β-nitro-1,3,5(10)-estratrienes of the formula:

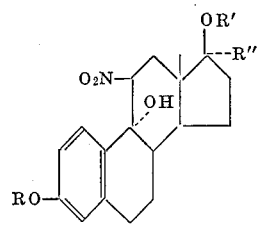

wherein R is selected from hydrogen, alkyl containing from 1 to 6 carbon atoms, ω-haloalkyl containing from 1 to 2 carbon atoms, cycloaliphatic radical containing from 5 to 6 carbon atoms, aliphatic acyl containing from 1 to 10 carbon atoms, cycloaliphatic acyl containing from 5 to 8 carbon atoms; R' is selected from hydrogen, monocarboxylic aliphatic acyl containing from 1 to 10 carbon atoms, di-carboxylic aliphatic acyl containing up to 6 carbon atoms and cycloaliphatic acyl containing from 5 to 8 carbon atoms; R" is selected from hydrogen, ethynyl and butinyl; OR' and R" may together be O.

Also described is the process for the preparation thereof.

The compounds of the invention may be prepared by a process which can be applied to steroids having in their molecule, the ring A which is aromatic and substituted by an activated group and furthermore a double bond in position 9 (11). More particularly, according to the process of the invention, a compound having the following structural formula:

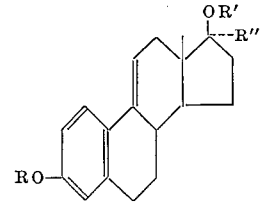

wherein R, R' and R" have the above meaning, dissolved in a suitable solvent such as diisopropylether, dioxane, diethyl ether, ethyl-acetate and nitromethane is made to react with a nitrating agent such as fuming nitric acid and nitrogen dioxide at a temperature of from −40° C. and room temperature in an anhydrous atmosphere. It is extracted with a suitable organic solvent such as ethyl-acetate, diethylether and benzene. The extracts are neutralized by adding sodium bicarbonate. The nitro-hydroxysteroid is then separated by crystallization or chromatography.

The compounds of the invention display interesting pharmacological activities such as estrogenic, antiovulatory and antigonadotrophic activity. These compounds are particularly active when administered by oral route.

The estrogenic activity has been tested in female rats oophorectomized at least 10 days before the treatment and showing a diestrus smear. The compound was administered in a single dose either by subcutaneous or oral route. The vaginal smears are controlled during the following two days and they are classified according to Allen and Doisy.

The minimal effective dose (MED) represents the amount of the compound necessary to induce proestrus in two out of three animals or estrus in one out of two animals.

The anti-ovulatory activity has been tested in female rats having a regular estrous cycle, controlled for at least 15 consecutive days. The compound was administered by subcutaneous or oral route once daily for 5 consecutive days starting from the last metestrus. The left and the right ovary was dissected at the 4th and 5th day respectively. The Fallopian tubes were separated and examined for the presence of ova.

The effective Dose$_{50}$ represents the amount of the compound which is necessary to inhibit ovulation in 50% of treated animals.

The antigonadotrophic activity has been tested in parabiotic rats (casturated male—intact female). The compound was administered by subcutaneous or oral route during 10 consecutive days to the male partner.

The effective Dose$_{50}$ represents the amount of the compound which is necessary to induce a 50% inhibition of the ovarian weight in the female partner as referred to untreated controls.

The compounds of the invention were separated in three groups in accordance to their chemical structure and their pharmacological activities tested in comparison with the activities of estradiol, estrone and 17$a$-ethynyl-estradiol. These results are listed in the table.

| Compound | Estrogenic activity MED $\mu$g./animal | | Antiovulatory activity ED$_{50}$ $\mu$g./animal | | Antigonadotrophic activity ED$_{50}$ $\mu$g./animal | |
|---|---|---|---|---|---|---|
| | s.c. | os | s.c. | os | s.c. | os |
| 1,3,5(10)-estratrien-3,17$\beta$-diol(estradiol) | 0.1 | 30 | 3 | >30 | 0.01 | 5 |
| 11$\beta$-nitro-1,3,5(10)-estratrien-3,9$\alpha$,17$\beta$-triol | 30 | 30 | 10 | >30 | 0.5 | 0.7 |
| 3-methoxy-11$\beta$-nitro-1,3,5(10)-estratrien-9$\alpha$,17$\beta$-diol | 1 | 1 | 1 | 3 | 0.3 | 0.3 |
| 3-methoxy-11$\beta$-nitro-1,3,5(10)-estratrien-9$\alpha$,17$\beta$-diol-17-acetate | 3 | 1 | 5 | 5 | 0.4 | 1 |
| 1,3,5(10)-estratrien-3-ol-17-one(estrone) | 0.1 | 10 | 10 | >100 | 0.05 | 15 |
| 11$\beta$-nitro-1,3,5(10)-estratrien-3,9$\alpha$-diol-17-one | 3 | 1 | 6 | 4 | 0.4 | 0.4 |
| 3-methoxy-11$\beta$-nitro-1,3,5(10)-estratrien-9$\alpha$-ol-17-one | 3 | 3 | 20 | 9 | 2.1 | 1.6 |
| Do | 10 | 10 | 7 | 6 | 2 | 1 |
| ($\pm$)-3-methoxy-11$\beta$-nitro-1,3,5(10)-estratrien-9$\alpha$-ol-17-one | 3 | 3 | 50 | 60 | 5 | 4 |
| 3-cyclopentoxy-17$\beta$-nitro-1,3,5(10)-estratrien-9$\alpha$-ol-17-one | 1 | 1 | 40 | 30 | | |
| 1,3,5(10)-estratrien-17$\beta$-ethynyl-3,17$\beta$-diol | 0.1 | 3 | 0.2 | 26 | 0.006 | 0.2 |
| 3-methoxy-1,3,5(10)-estratrien-17$\alpha$-ethynyl-3,17$\beta$-diol | 3 | 10 | 24 | 100 | 0.2 | 0.3 |
| 3-methoxy-11$\beta$-nitro-17$\alpha$-ethynyl-1,3,5(10)-estratrien-9$\alpha$-17$\beta$-diol | 1 | 1 | 3 | 3 | 0.2 | 0.1 |

From the table it appears that 3-methoxy-11$\beta$-nitro-1,3,5(10)-estratrien-9$\alpha$,17$\beta$-diol and 3-methoxy-11$\beta$-nitro-1,3,5(10)-estratrien-9$\alpha$,17$\beta$-diol-17-acetate show an estrogenic activity almost 30 times higher than that of the standard compound 1,3,5(10)-estratrien-3,17$\beta$-diol. The anti-ovulatory activity of these two compounds when administered subcutaneously is similar to that of the standard, while it is from at least 6 to 10 times higher when administered orally.

Among the estrone derivatives, 11$\beta$-nitro-1,3,5(10)-estratrien - 3,9$\alpha$ - diol-17-one, 3-methoxy-11$\beta$-nitro-1,3,5 (10) - estratrien-9$\alpha$-ol-17one and ($\pm$)-3-methoxy-11$\beta$-nitro-1,3,5(10)-estratrien-9$\alpha$-ol-17-one show a very interesting activity either by oral or subcutaneous administration. It should be pointed out that natural compounds (estrone and estradiol), which have no alkyl radical in C$_{17}$, do not possess a significant oral potency. The anti-ovulatory activity of these compounds, when administered orally, is from 2 to 20 times higher than that of estrone. It should be taken into consideration that 3-acetoxy-11$\beta$-nitro - 1,3,5(10) - estratrien-9$\alpha$-ol-17-one shows an anti-ovulatory activity, by oral route, at least 15 times higher than that of estrone while its estrogenic activity, by oral route, is similar to that of the standard compound.

Among the ethynyl-estradiol 3-methyl-ether derivatives, 3 - methoxy-11$\beta$-nitro-17$\alpha$-ethynyl-1,3,5(10)-estratrien-9$\alpha$,17$\beta$-diol, is active by oral route as well as by subcutaneous route as far as the considered activities are concerned. This product is 10 times more estrogen and 30 times more anti-ovulatory than its analogue (3-methoxy-17$\alpha$-ethynyl-estradiol). 3 - methoxy-11$\beta$-nitro-17$\alpha$-ethynyl-1,3,5(10)-estratrien-9$\alpha$,17$\beta$-diol, by oral route, is 3 times more estrogen and 8 times more anti-ovulatory than ethynyl-estradiol which is considered up to now the most active standard.

The following examples serve to illustrate the compounds of the invention and preparation thereof without limiting the invention.

EXAMPLE 1

3-methoxy-11$\beta$-nitro-1,3,5(10)-estratrien-9$\alpha$,17$\beta$-diol 17-acetate 12 cc. of fuming nitric acid (density 1.52) is added while stirring, to 1.8 g. of 3-methoxy-1,3,5(10),9(11)-estratetraen-17$\beta$-ol acetate dissolved in 80 cc. of anhydrous diethyl ether at 0° C. The mixture is kept agitated during two hours while maintaining the temperature at 0° C. Ice is added; the mixture is then extracted three times with diethyl ether. The extracts are washed with water, a 5% sodium bicarbonate solution, then with water until neutrality. The solution is then dried over anhydrous sodium sulphate and the solvent is distilled after filtering. A residue of 2.2 g. is collected which is recrystallized from diethyl ether, from which 1 g. of 3-methoxy-11$\beta$-nitro-1,3,5(10)-estratrien-9$\alpha$,17$\beta$-diol 17 - acetate melting at 180–182° C., $[\alpha]_D^{20°}=-49°$ (from chloroform) is obtained.

EXAMPLE 2

3-n.butoxy-11$\beta$-nitro-1,3,5(10)-estratrien-9$\alpha$,17$\beta$-diol 17-acetate The operation is carried out as above described using as the starting material 3 - n.butoxy - 1,3,5(10),9(11)-estratetraene-17$\beta$-ol acetate. By crystallization from ethyl ether, 3 - n.butoxy - 11$\beta$-nitro-1,3,5(10)-estratrien-9$\alpha$,17$\beta$-diol 17-acetate is obtained.

EXAMPLE 3

3-methoxy-11$\beta$-nitro-1,3,5(10)-estratrien-9$\alpha$-ol-17-one 6 cc. of fuming nitric acid (densty 1.52) is added to 1 g. of 3-methoxy-1,3,5(10), 9(11)-estratetraen-17-one dissolved in 50 cc. of anhy;drous diethyl ether at 0° C. The mixture is kept at 0° C. and stirred during 30 minutes, diluted with ice cold water, then the steroid is extracted with diethyl ether. The ether extracts are washed with a 5% sodium bicarbonate solution, then with water until neutrality, dried over anhydrous sodium sulphate and evaporated to dryness in vacuo. The residue is crystallized from acetone/petroleum ether and gives 3-methoxy-11$\beta$ - nitro - 1,3,5(10)-estratrien-9$\alpha$-ol-17-one melting at 218–221° C.; $[\alpha]_D^{20°}=+32°$ (from chloroform).

EXAMPLE 4

3-cyclopentoxy-11$\beta$-nitro-1,3,5(10)-estratrien-9$\alpha$-ol-17-one

The operation is carried out as above described using as the starting material 3-cyclopentoxy-1,3,5-(10),9(11)-estratetraene-17-one. From acetone/diethyl ether crystallizes 3-cyclopentoxy-11$\beta$-nitro-1,3,5(10)-estratrien-9$\alpha$-ol-17-one, which melts at 218–223° C.; $\lambda_{max}$ 228 and 277 m$\mu$; $\epsilon_{277}$=1.540; $[\alpha]_D^{20°}=+27$ (chloroform).

EXAMPLE 5

3-methoxy-11$\beta$-nitro-1,3,5(10)-estratrien-9$\alpha$,17$\beta$-diol 3 cc. of fuming nitric acid (density 1.52) is added while stirring to a solution in 25 cc. of anhydrous diethyl ether of 480 mg. of 3-methoxy-1,3,5(10),9(11)-estratetraene-17β-ol kept at −5° C. The temperature is maintained at 0° C., the solution stirred during 20 minutes, diluted with water and ice. The steroid is then extracted with ethyl-acetate. The extracts are washed with a 5% sodium bicarbonate solution, then with water until neutrality, dried over anhydrous sodium sulphate and evaporated to dryness. 3 - methoxy-11β-nitro-1,3,5(10)-estratrien-9α,17β-diol, does not separate as crystalline compound but precipitates from petroleum ether as a foam which by treatment with acetic anhydride gives the corresponding 17-acetate having the characteristics of the compound of Example 1.

EXAMPLE 6

3-acetoxy-11β-nitro-1,3,5(10)-estratrien-9α-ol-17-one 15 cc. of fuming nitric acid (density 1.52) is added to a solution of 2 g. of 3-acetoxy-1,3,5(10),9(11)-estratetraene-17-one in 100 cc. of anhydrous diethyl ether at 0° C. under stirring. The temperature is kept at 0° C. After the acid addition, the reaction mixture is further agitated during 30 minutes at 0° C., then diluted with water and ice. The steroid is extracted with diethyl ether. The organic layers are collected together, washed with a 5% sodium bicarbonate solution, with water until neutrality, dried over anhydrous sodium sulphate and evaporated to dryness. The residue gives after recrystallizing from acetone/diethyl ether 3 - acetoxy - 11β-nitro-1,3,5(10)-estratrien-9α-ol-17-one melting at 228–235° C. Melting point, after the compound is recrystallized from acetone/diethyl ether, goes up to 235–238° C.; $[\alpha]_D^{20} = +34°$ (CHCl$_3$); $\lambda_{max}^{C_2H_5OH} = 268$ m$\mu$, $\epsilon = 800$, $\lambda_{inflexion}^{C_2H_5OH} = 273$ m$\mu$, $\epsilon = 695$

EXAMPLE 7

11β-nitro-1,3,5(10)-estratrien-3,9α-diol-17-one

The operation is carried out as above, using as the starting material, 3-hydroxy-1,3,5(10),9(11)-estratetraene - 17 - one. 11β-nitro-1,3,5(10)-estratrien-3,9α-diol-17-one melting at 225–228° C.; $\lambda_{max}^{C_2H_5OH} = 276$ m$\mu$; $\epsilon = 2.580$; $\lambda_{inflexion}^{C_2H_5OH} = 283$ m$\mu$; $\epsilon = 2250$

EXAMPLE 8

11β-nitro-1,3,5(10)-estratrien-3,9α,17β-triol 3,17-diacetate

The operation is carried out as above, using as the starting material, 3,17β-diol-1,3,5(10),9(11)-estratetraene 3,17 - diacetate. 11β-nitro-1,3,5(10)-estratrien-3,9α,17β-triol 3, 17-diacetate melting at 215–218° C. is obtained.

EXAMPLE 9

11β-nitro-1,3,5(10)-estratrien-3,9α,17β-triol

The operation is carried out as above, but the starting material is 1,3,5(10),9(11)-estratetraen-3,17β-diol. The compound obtained, 11β-nitro-1,3,5(10)-estratrien-3,9α,17β-triol does not crystallize; but separates as a foam, from which by treatment with acetic anhydride in pyridine at room temperature over night, the corresponding 3,17-diacetate having the characteristics of the compound of Example 8, is obtained.

EXAMPLE 10

3-methoxy-11β-nitro-17α-ethynyl-1,3,5(10)-estratrien-9α,17β-diol 4.2 cc. of fuming nitric acid is added to a solution of 700 mg. of 3 - methoxy - 17α - ethynyl-1,3,5(10),9(11)-estratetraen-17β-ol in 35 cc. of anhydrous diethyl ether cooled to −20° C. The temperature is kept at −20° C. and the mixture is stirred during 20 minutes, diluted with 50 cc. of a 20% sodium acetate solution and the steroid extracted with diethyl ether. The organic layer is washed with a 5% sodium bicarbonate solution and with water until neutrality, dried over anhydrous sodium sulphate and evaporated to dryness. Pure, but not crystalline, 3-methoxy - 11β - nitro - 17α-ethynyl-1,3,5(10)-estratrien-9α,17β-diol is obtained by double chromatography on thin layer; $[\alpha]_D^{20°} = -83°$ (CHCl$_3$) I.R.=3400, 3300, 1620, 1550, 1510 cm.$^{-1}$.

EXAMPLE 11

3-methoxy-11β-nitro-17α-(2′-butinyl)-1,3,5(10)-estratrien-9α,17β-diol

The operation is carried out as in Example 10, but using as the starting material 3-methoxy-17α(2′-butinyl)-1,3,5(10),9(11) - estratetraen - 17β-ol. 3-methoxy-11β-nitro - 17α-(2′-butinyl)-1,3,5(10)-estratrien-9α,17β-diol is obtained.

EXAMPLE 12

3-methoxy-11β-nitro-1,3,5(10)-estratrien-9α,17β-diol 17-hexanoate

The operation is carried out as above, but using as the starting material, 3-methoxy-1,3,5(10),9(11)-estratetraen-17β-ol hexanoate. 3-methoxy-11β-nitro-1,3,5(10)-estratrien-9α,17β-diol 17-hexanoate is obtained.

EXAMPLE 13

(±)3-methoxy-11β-nitro-1,3,5(10)-estratrien-9α-ol-17-one

The operation is carried out as described in Example 3, but using as the starting material (±)3-methoxy-1,3,5(10),9(11)-estratetraen-17-one. (±)3-methoxy-11β-nitro - 1,3,5(10) - estratrien - 9α - ol - 17 - one melting at 187–191° C. is obtained.

EXAMPLE 14

3-(2′-chloroethoxy)-11β-nitro-1,3,5(10)-estratriene-9α-ol-17-one

Grams 2.45 of 1,3,5(10),9(11) - estratetraen-3-ol-17-one treated with ethylencarbonate in a sodium amilate solution gave 1.76 g. of 3 - (2′ - hydroxy - ethoxy)-1,3,5(10),9(11)-estratetraen-17-one which are then reacted with mesylchloride in pyridine and successively with litium chloride in isopropilic alcohol to afford 1.62 g. of 3 - (2′ - chloroethoxy) - 1,3,5(10),9(11) - estratetraen-17-one.

Grams 1.62 of crude 3 - (2′-chloroethoxy)-1,3,5(10),9(11)-estratetraen-17-one were dissolved in 100 cc. of anhydrous ethyl ether: the solution was colled at −15 C. and 2 cc. of nitrogen dioxide dissolved in 20 cc. of anhydrous ethyl ether were added with stirring in 10 minutes. The solution stirred for five minutes at −15° C. and, then at room temperature for 10 minutes, was washed with a 5% sodium bicarbonate solution, with water till neutrality, dried over anhydrous sodium sulphate and evaporated to dryness. The residue crystallized from acetone-ethyl ether-petroleum ether gave 800 mg. of 3-(2′-chloroethoxy)-11β-nitro - 1,3,5(10) - estratrien - 9α - ol - 17 - one melting at 195–197° C. Recrystallization from the same solvents, gave a product melting at 204–205° C.; $[\alpha]_D^{20} = +28°$ (CHCl$_3$)

$\lambda_{max.}^{C_2H_5OH}$ 277 m$\mu$ $\epsilon$ 1.600; $\lambda_{max.}^{C_2H_5OH}$ 284 m$\mu$ $\epsilon$ 1.340

EXAMPLE 15

11β-nitro-1,3,5(10)-estratrien-3,9α-diol-17-one 3-hexanoate

Operation was carried out as previously described using as starting material the crude 1,3,5(10),9(11) - estratetraen-3-ol-17-one 3-hexanoate which was obtained by reaction of 1,3,5(10),9(11) - estratetraen-3-ol-17-one with hexanoic chloride in pyridine. 11β-nitro-1,3,5(10)-estratrien-3,9α-diol-17-one 3-hexanoate was obtained and then crystallized from acetone-ethyl ether-petroleum ether. It melts at 151–153° C.; $[\alpha]_D = +26°$ (CHCl), $\lambda_{max.}^{C_2H_5OH}$ 268 mμ $\epsilon = 870$ $\lambda_{max.}^{C_2H_5OH}$ 277.5 mμ $\epsilon = 750$

EXAMPLE 16

11β-nitro-1,3,5(10)-estratrien-3,9α-diol-17-one 3-cyclopentylpropionate

Operation was carried out as previously described using as starting material crude 1,3,5(10),9(11)-estratetraen-3-ol-17-one 3 - cyclopentylpropionate which was obtained esterifying 1,3,5(10),9(11)-estratetraen-3-ol-17-one with cyclopentylpropionil chloride in pyridine. 11β-nitro-1,3,5(10)-estratrien-3,9α-diol-17-one 3 - cyclopentylpropionate was obtained and then crystallized from acetone-petroleum ether. It melts at 193–195° C.; $[\alpha]_D = +25°$ (CHCl₃);

$\lambda_{max.}^{C_2H_5OH}$ 267 mμ $\epsilon$ 910; $\lambda_{max.}^{C_2H_5OH}$ 275.5 mμ $\epsilon$ 750

EXAMPLE 17

3-methoxy-11β-nitro-1,3,5(10)-estratrien-9α,17β-diol 17-cyclopentylpropionate

Grams 1 of crude 3-methoxy-1,3,5(10),9(11)-estratetraen-17β-ol cyclopentylpropionate, obtained by reaction of 1.2 g. of 3-methoxy-1,3,5(10),9(11)-estratetraen-17β-ol with 1 cc. of cyclopentylpropionil chloride in 10 cc. of pyridine, were dissolved in 50 cc. of nitromethane; to the solution cooled to —10° C. were added with stirring in 10 minutes 0.7 cc. of nitrogen dioxide dissolved in 10 cc. of nitromethane; the solution stirred at —10° C. for 10 minutes, then 5 minutes at room temperature, was poured in a 5% sodium bicarbonate solution; the steroid was extracted several times with ethyl ether; the organic layers were collected together, washed with water till neutrality, dried over anhydrous sodium sulphate and evaporated to dryness.

The residue was purified by chromatography; 3-methoxy-11β-nitro-1,3,5(10)-estratrien-9α,17β-diol 17 - cyclopentylpropionate was obtained and crystallized from ethyl ether-petroleum ether. It melts at 145–146° C.; $[\alpha]_D = -28°$ (CHCl₃)

$\lambda_{max.}^{C_2H_5OH}$ 277.5 mμ $\epsilon$ 1650; $\lambda_{max.}^{C_2H_5OH}$ 285 mμ $\epsilon$ 1470

EXAMPLE 18

3-methoxy-11β-nitro-1,3,5(10)-estratrien-9α,17β-diol 17-hemisuccinate

Milligrams 730 of crude 3-methoxy-1,3,5(10),9(11)-estratetraen-17β-ol 17-hemisuccinate, obtained by reaction of 800 mg. of 3 - methoxy-1,3,5(10),9(11)-estratetraen-17β-ol with 800 mg. of succinic anhydride in 5 cc. of pyridine, were dissolved in 30 cc. of nitromethane; to the solution cooled to —10° C. were added with stirring in 10 minutes 7 cc. of nitromethane containing 0.5 cc. of nitrogen dioxide.

The solution was stirred 10 minutes at —10° C., diluted with ethyl ether and the steroid extracted several times with a 5% sodium bicarbonate solution. The aqueous layers collected together were acidified with acetic acid and the steroid re-extracted with ethyl acetate. The organic layers collected together were washed with water, dried over anhydrous sodium sulphate and evaporated to dryness.

The 3 - methoxy-11β-nitro-1,3,5(10)-estratrien-9α,17β-diol 17-hemisuccinate is obtained in amorphous form: its I.R. absorption spectrum shows bands at 2800–2500, 1730, 1550 cm.⁻¹.

We claim:
1. Process for the preperation of new nitro-estratrienes of the structure:

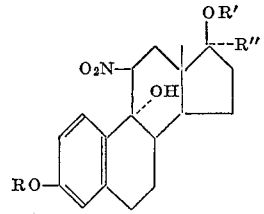

wherein R is selected from hydrogen, alkyl containing from 1 to 6 carbon atoms, ω-haloalkyl containing from 1 to 2 carbon atoms, cycloaliphatic radical containing from 5 to 6 carbon atoms, aliphatic acyl containing from 1 to 10 carbon atoms, cycloaliphatic acyl containing from 5 to 8 carbon atoms; R' is selected from hydrogen, monocarboxylic aliphatic acyl containing from 1 to 10 carbon atoms, di-carboxylic aliphatic acyl containing up to 6 carbon atoms and cycloaliphatic acyl containing from 5 to 8 carbon atoms; R" is selected from hydrogen, ethynyl and butinyl; OR' and R" may together be O; which comprises treating a compound of the formula:

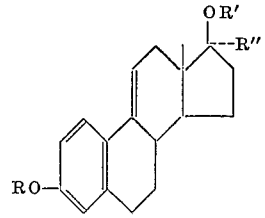

wherein R, R' and R" have the above meaning with a nitrating agent selected from fuming nitric acid and nitrogen dioxide at a temperature between —40° C. and room temperature and then separating the nitro-steroid.

2. Nitro-estratrienes of the formula:

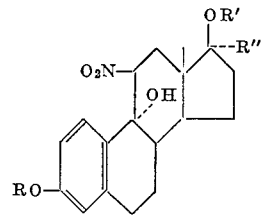

wherein R is selected from hydrogen, alkyl containing from 1 to 6 carbon atoms, ω-haloalkyl containing from 1 to 2 carbon atoms, cycloaliphatic radical containing from 5 to 6 carbon atoms, aliphatic acyl containing from 1 to 10 carbon atoms, cycloaliphatic acyl containing from 5 to 8 carbon atoms; R' is selected from hydrogen, monocarboxylic aliphatic acyl containing from 1 to 10 carbon atoms, di-carboxylic aliphatic acyl containing up to 6 carbon atoms and cycloaliphatic acyl containing from 5 to 8 carbon atoms; R" is selected from hydrogen, ethynyl and butinyl; OR' and R" may together be O.

3. The compound of claim 2, which is 3-methoxy-11β-nitro-1,3,5(10)-estratrien-9α,17β-diol 17 acetate.

4. The compound of claim 2, which is 3-n.butoxy-11β-nitro-1,3,5(10)-estratrien-9α,17β-diol 17-acetate.

5. The compound of claim 2, which is 3-methoxy-11β-nitro-1,3,5(10)-estratrien-9α-ol-17-one.

6. The compound of claim 2, which is 3-cyclopentoxy-11β-nitro-1,3,5(10)-estratrien-9α-ol-17-one.

7. The compound of claim 2, which is 3-methoxy-11β-nitro-1,35(10)-estratrien-9α,17β-diol.

8. The compound of claim 2, which is 3-acetoxy-11β-nitro-1,3,5(10)-estratrien-9α-ol-17-one.

9. The compound of claim 2, which is 11β-nitro-1,3,5(10)-estratrien-3,9α-diol-17-one.

10. The compound of claim 2, which is 11β-nitro-1,3,5(10)-estratrien-3,9α,17β-triol-3,17-diacetate.

11. The compound of claim 2, which is 11β-nitro-1,3,5(10)-estratrien-3,9α,17β-triol.

12. The compound of claim 2, which is 3-methoxy-11β-nitro-17α-ethynyl-1,3,5(10)-estratrien-9α,17β-diol.

13. The compound of claim 2, which is 3-methoxy-11β-nitro-17α-(2'-butinyl)-1,3,5(10)-estratrien-9α,17β-diol.

14. The compound of claim 2, which is 3-methoxy-11β-nitro-1,3,5(10)-estratrien-9α,17β-diol 17-hexanoate.

15. The compound of claim 2, which is (±)-3-methoxy-11β-nitro-1,3,5(10)-estratrien-9α-ol-17-one.

16. The compound of claim 2, which is 3-(2'-chloroethoxy)-11β-nitro-1,3,5(10)-estratriene-9α-ol-17-one.

17. The compound of claim 2, which is 11β-nitro-1,3,5(10)-estratrien-3,9α-diol-17-one 3-hexanoate.

18. The compound of claim 2, which is 11β-nitro-1,3,5(10)-estratrien-3,9α-diol-17-one 3-cyclopentylpropionate.

19. The compound of claim 2, which is 3-methoxy-11β-nitro-1,3,5(10)-estratrien-9α,17β-diol 17-cyclopentylpropionate.

20. The compound of claim 2, which is 3-methoxy-11β-nitro-1,3,5(10)-estratrien-9α,17β-diol 17-hemisuccinate.

No references cited.

HENRY A. FRENCH, Primary Examiner

U.S. Cl. X.R.

260—397.5, 999

PO-1050
(5/69)

UNITED STATES PATENT OFFICE
CERTIFICATE OF CORRECTION

Patent No. 3,520,909      Dated July 21, 1970

Inventor(s) Albert Consonni, Bianca Patelli and Roberto Sciaky

It is certified that error appears in the above-identified patent and that said Letters Patent are hereby corrected as shown below:

In the heading to the printed specification, line 10, "Nov. 15, 1967," should read --Nov. 18, 1966--

SIGNED AND
SEALED
DEC 15 1970

(SEAL)
Attest:

Edward M. Fletcher, Jr.
Attesting Officer

WILLIAM E. SCHUYLER, JR.
Commissioner of Patents